United States Patent [19]

Hamilton

[11] Patent Number: 5,239,391
[45] Date of Patent: Aug. 24, 1993

[54] APPARATUS FOR GENERATING HALFTONE DOTS FROM DOT ENVELOPE PARAMETERS

[75] Inventor: John F. Hamilton, Rochester, N.Y.

[73] Assignee: Eastman Kodak Company, Rochester, N.Y.

[21] Appl. No.: 854,176

[22] Filed: Mar. 20, 1992

[51] Int. Cl.$^5$ .................. H04N 1/387; G06F 3/12; G06F 15/62

[52] U.S. Cl. .................. 358/459; 358/460; 358/498; 395/110

[58] Field of Search ............. 358/298, 456, 459, 460; 395/110, 109; 382/44, 45

[56] References Cited

U.S. PATENT DOCUMENTS

| | | | |
|---|---|---|---|
| 4,097,847 | 6/1978 | Forsen et al. | 382/44 |
| 4,321,631 | 3/1982 | Saito et al. | 358/298 |
| 4,345,245 | 8/1982 | Vella et al. | 382/45 |
| 4,363,103 | 12/1982 | Benveniste et al. | |
| 4,481,602 | 11/1984 | Edgar et al. | |
| 4,627,002 | 12/1986 | Blum et al. | 395/110 |
| 4,675,830 | 6/1987 | Hawkins | |
| 4,912,562 | 3/1990 | Fenster et al. | 358/298 |
| 4,916,545 | 4/1990 | Granger | 358/456 |
| 4,937,761 | 6/1990 | Hassett | 395/110 |
| 5,097,426 | 3/1992 | Kawamura | 395/110 |
| 5,119,439 | 6/1992 | Osawa et al. | 382/44 |
| 5,129,050 | 7/1992 | Ikenoue et al. | 395/110 |
| 5,138,696 | 8/1992 | Nagata | 395/110 |
| 5,150,225 | 9/1992 | Kreitman | 358/456 |
| 5,167,013 | 11/1992 | Hube et al. | 395/110 |
| 5,175,821 | 12/1992 | Dutcher et al. | 395/110 |

FOREIGN PATENT DOCUMENTS 2160383A 3/1985 Japan.

Primary Examiner—Edward L. Coles, Sr.
Assistant Examiner—Scott A. Rogers
Attorney, Agent, or Firm—Edward Dugas

[57] ABSTRACT

An apparatus, implemented in a halftone printing system, permits a halftone dot to be represented by an envelope that is formed from a combination of straight lines that are drawn from tangent points, on the outer periphery of the dot, to a reference axis for the dot. The intersection points of the tangent lines on the reference axis define the size (density) of the dot. The apparatus addressably stores the intersect points as sets of values for each size dot to provide a unique representation set that can be accessed to reconstruct a selected dot size for printing a halftone image.

8 Claims, 14 Drawing Sheets

APPARATUS FOR GENERATING HALFTONE DOTS FROM DOT ENVELOPE PARAMETERS

CROSS-REFERENCE TO RELATED APPLICATION

The present application is related to an application filed on the same day as the present application and entitled "An Envelope Method for Halftone Dot Representation" bearing assignee's docket no. 61,193.

FIELD OF INVENTION

The present invention is directed to the field of halftone printing wherein arrays of bit maps are used to form dot shapes on the printing media and more particularly to an apparatus for enabling the representation of the shapes of the dots with a minimum amount of memory.

BACKGROUND OF THE INVENTION

In the halftone printing art variations in the density of a color are represented by variations in the size (area) of small dots on a grid pattern. This permits the visual detection of shades of gray and color tone. A patent of interest for its teaching of dot size being a function of density is U.S. Pat. No. 4,680,645, entitled "Method For Rendering Gray Scale Images With Variable Dot Sizes" by Dispoto et al. With such methods the dots themselves do not have to be circular in shape but can have any number of shapes. With the advent of digital computers and digital printers into the printing art, digital bits, representing the desired sizing and shape of the dots, are stored and accessed from the computer or printer's memory and are used to cause the desired printing of the images onto hard copy. In digital systems the halftone dot shapes may be stored either as arrays of threshold values (e.g. $64 \times 64 \times 8$ bits) or as arrays of bitmaps (e.g. $64 \times 64 \times 256$ bits). The quality of the shape of the dots is a function of the number of bits (sample points) that are used in the printing process. Obviously, as more bits are used to increase the quality of the formed dot the greater will be the use of the computer or printer's memory space. In addition, with more bits stored in memory the longer it will take, in terms of access time, to call forth all the bits needed to drive the printing device. In the art, the number of sample points used to represent an image in an array of spaced rows and columns of sample points is called the mesh. It has been shown that there is an improvement in the quality of formed dots when the number of sample points in an array increases. What is known is that sampling in a $256 \times 256$ array or a $128 \times 128$ array, in place of a $64 \times 64$ array, achieves only a slightly improved dot shape at the cost of 16 times and 4 times, respectively, in the amount of memory required to store the threshold or bitmap values.

In addition to the above mentioned increase in memory requirement, to achieve an increase in the quality of the formed dots when a digital screening pattern is used to print out the dots a problem of automoire or patterning is created. This is caused by the step of re-sampling the already sampled dot shapes. These problems have caused a great deal of development time to be spent looking for the "magic" combinations of screen rulings and screen angles which will produce dots without moire through the entire range of dot sizes. The present invention provides an improved solution to these problems.

SUMMARY OF THE INVENTION

The present invention uses an "envelope" technique for defining the shape and the size of dots by approximating the dot's shape with an envelope of lines straight or curved. When a symmetrical dot, such as a square or a circle, is the selected shape only the bit values representing one-eight of the dot need be used to replicate the full dot. Also, by using lines having slopes which are exact powers of two, the required multiplications needed to form the envelope of the dot can be achieved by simply shifting bits. For the case of an "elliptical" halftone dot the "envelope" technique may still be used, but twice as much information is needed because the required degree of symmetry no longer holds.

In the apparatus for enabling the "envelope" technique there is provided an addressable memory for storing a plurality of dot descriptors each at its own address with each descriptor formed from a set of dot parameters and each set of parameters including intercept values representing corresponding halftone dot sizes wherein dot size corresponds to a density value and wherein the intercept values represent the intercept of tangent lines with a reference axis and the outer boundary of the dot. Additionally, the apparatus receives signals representing the printing position of a dot onto a receiving medium and for selecting fonts and for providing a partial address to the addressable memory. A contone value is applied to the addressable memory to provide the remaining portion of the address to select a corresponding set of dot parameters and an engine is coupled to the addressable memory for receiving the set of dot parameters and the signals representing a dot's printing position for providing to a printing engine, control signals for causing the printing of the dot at the indicated position with the dot's size and shape being represented by the set of dot parameters.

From the foregoing it can be seen that it is a primary object of the present invention to provide an improved apparatus for digitally representing the shape and size of a halftone dot.

It is another object of the present invention to provide an apparatus that represents a halftone dot with a minimum number of binary bits which in turn reduces the amount of storage space (computer memory) needed for storing dots of various densities.

These and other objects of the present invention will become more apparent when taken in conjunction with the following description and drawings wherein like characters indicate like parts and which drawings form a part of the present description.

DESCRIPTION OF THE PREFERRED EMBODIMENTS

The block diagram illustrations of the Figures are primarily intended to illustrate the major structural components of the system in a convenient functional grouping, whereby the present invention may be more readily understood.

Figure 1A:
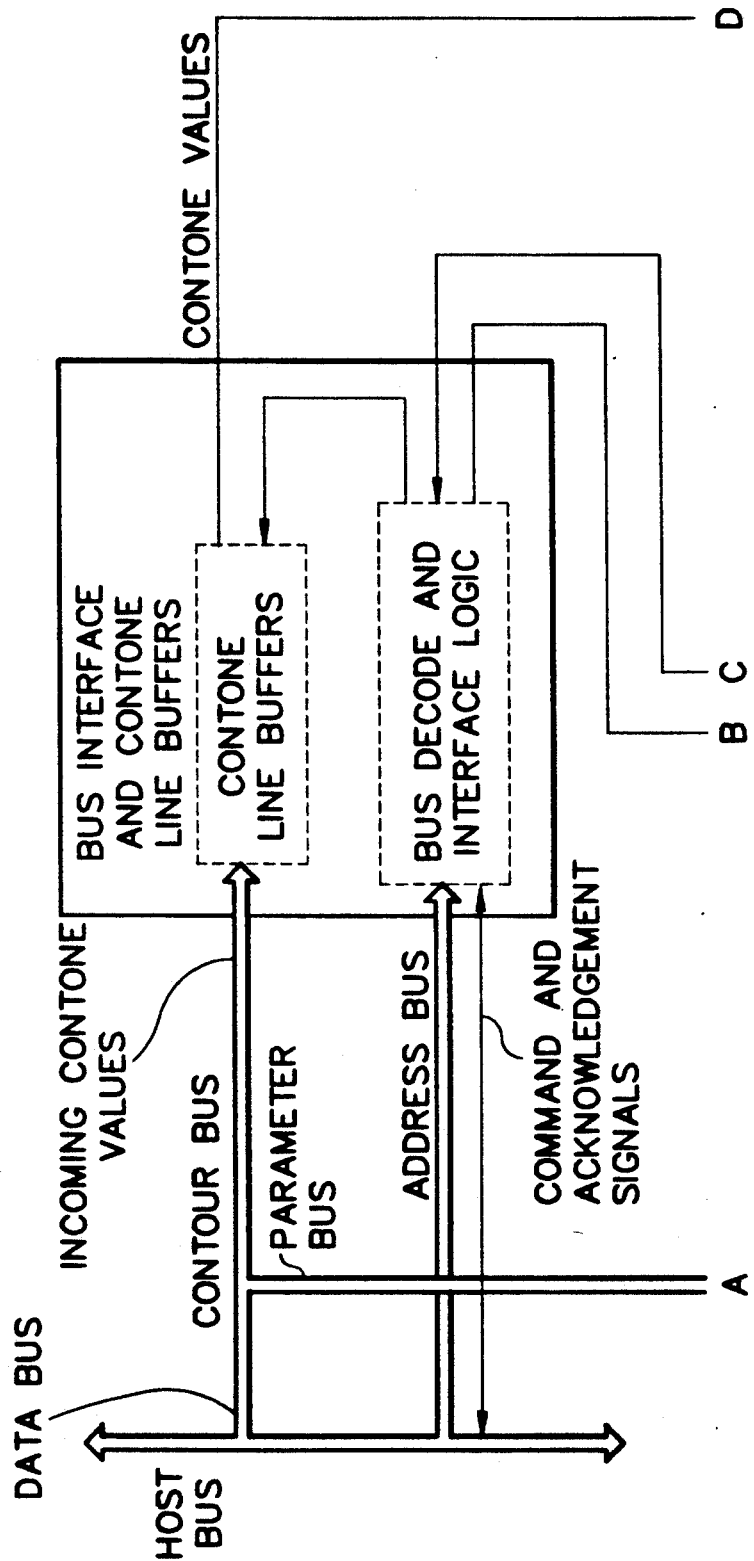
FIGS. 1A and 1B illustrate in block diagram form a prior art system in which the present apparatus may be implemented.
Figure 1B:
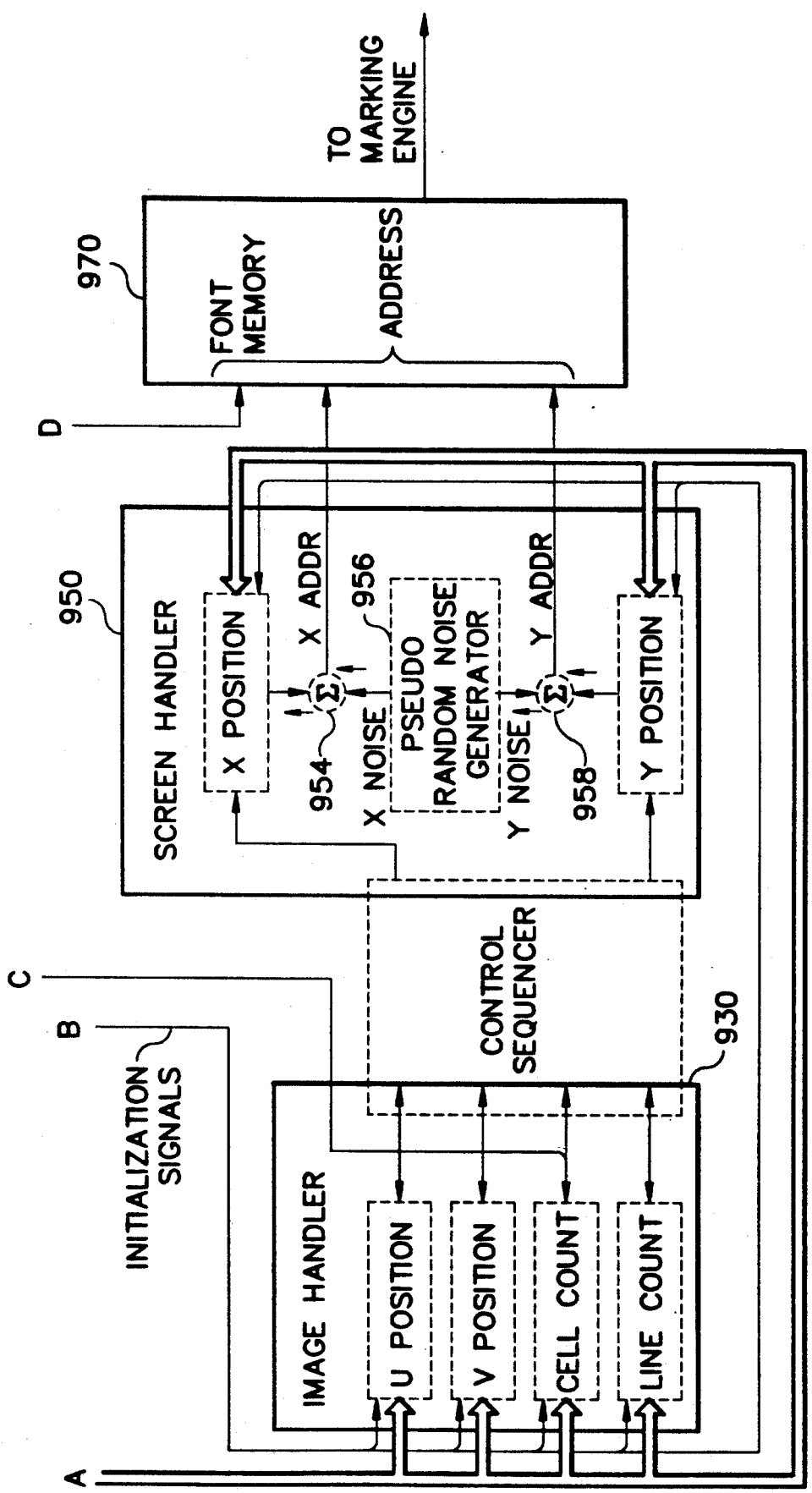

FIG. 1 illustrates one prior art version of a digital halftone printing system wherein the apparatus of the present invention may reside. FIG. 1 has been taken from FIG. 9 of U.S. Pat. No. 4,918,622 entitled "Electronic Graphic Arts Screener" by E. M. Granger and J. F. Hamilton. Dr. Hamilton is also the inventor of the present invention. The teachings of U.S. Pat. No. 4,918,622 are incorporated fully herein by reference. The image to be printed by the referenced system is formed into multi-bit pixel values (contone pixel values) that are sampled in response to the requirements of the marking engine (printing device such as a laser printer). Often the multi-bit pixel value is 8-bits in depth, but other values may also be used. For example, in the simplest situation, if the input image is sampled at 400 pixels per inch and the printing device writes at 2,000 spots per inch then each contone pixel value would be sampled 5 times by a screener (see for example the image handler 930 as described in detail in U.S. Pat. No. 4,918,622). For those instances where the sampling rate is not an exact divisor of the writing pitch the above referenced patent describes the procedure to be used in detail. Referencing the screen handler 950 of the subject patent the x-position and the y-position registers provide the x and y sampling coordinates to the font decoder 100 of the present invention, illustrated in FIG. 7. The pseudo random noise generator 956 and the summing nodes 954 and 958 shown in FIG. 9 box 950 of the 4,918,622 patent are not required for the present invention. The font decoder 100 also provides the improved means for supplying the bit mapped data thereby eliminating the extensive and costly font memory incorporated in the prior art font memory 970.

Figure 2A:
FIGS. 2A through 2I illustrate the sequence of development of dots each having a different density or area.
Figure 2B:
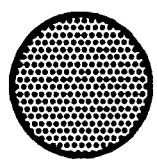
Figure 2C:
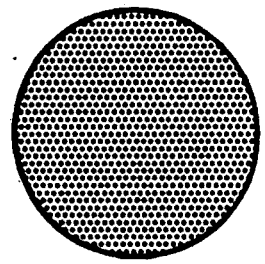
Figure 2I:
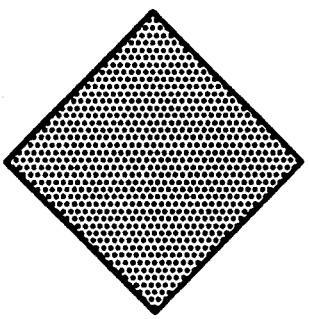
Figure 2D:
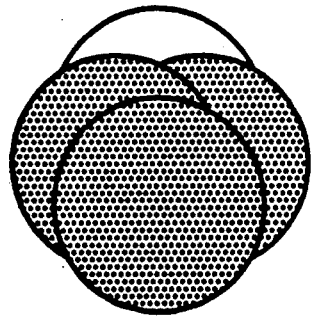
Figure 2H:
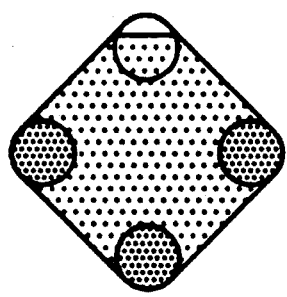
Figure 2G:
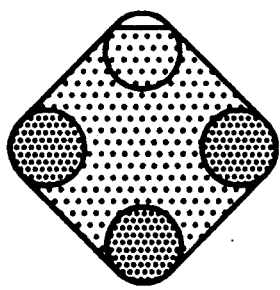
Figure 2F:
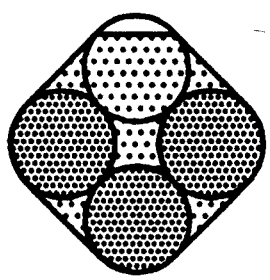
Figure 2E:
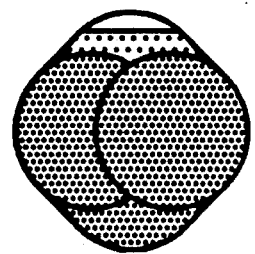

The following is a description of a novel technique for representing dots of differing sizes and shapes: FIGS. 2A through 2C, illustrate a sequence of circular dots of increasing size (area) that would be used to create regions of increasing density in a printed image. In the invention the size of the dots is requested, for example, by the contone values described above which are typically 0 to 255. FIGS. 2D through 2I show the transition of the dot shape from one size to a larger size, using circular and straight line components. FIG. 2I illustrates a dot shaped as a diamond. Although the dot shapes selected for purposes of illustration of dot transitions start as a circular shape and transform to a diamond shape in the preferred embodiment of the invention, many other transitional variations are possible within the teachings of the present invention. For example, the starting dot shape can be a diamond.

Figure 3:
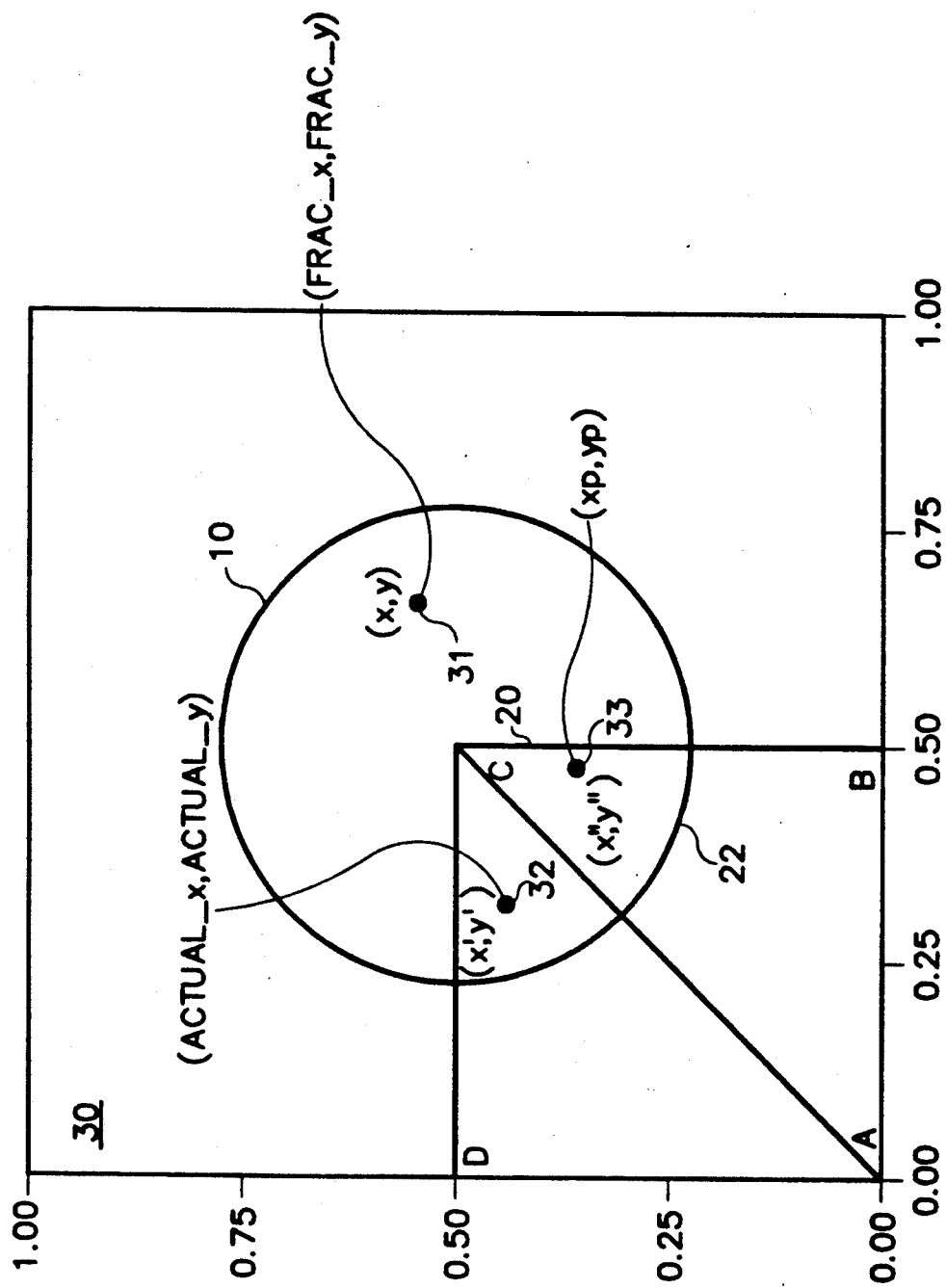
FIG. 3 illustrates the relationship of one of the circular dots of FIGS. 2A through 2C positioned within a halftone reference cell.

FIG. 3 is a diagram of a halftone reference cell 30 containing a circular dot 10. Due to the symmetry of the circular dot 10 the lower left quadrant 20, defined by vertices A,B,C, and D, represents the remaining three quadrants. One additional symmetry (about the diagonal line AC permits the restriction of the discussion to the lower right triangle ABC within the quadrant 20. A coordinate system for the reference cell 30 is shown normalized such that any point in the reference cell may be expressed as an ordered pair of values between 0 and 1.

Figure 4A:
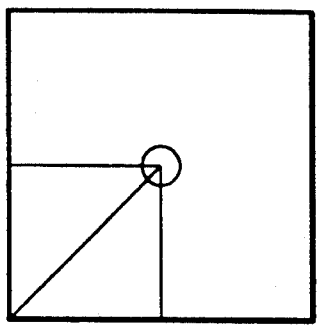
FIGS. 4A through 4I illustrate the correspondence of the dots of FIGS. 2A through 2I positioned within unit reference cells.
Figure 4B:
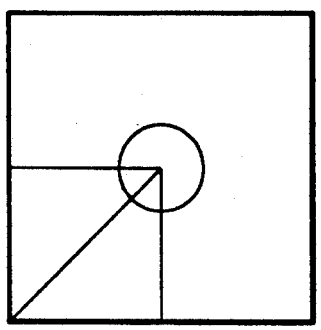
Figure 4C:
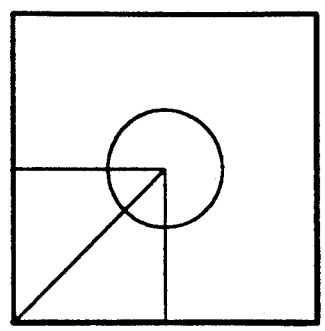
Figure 4D:
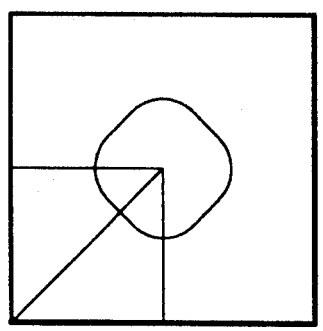
Figure 4E:
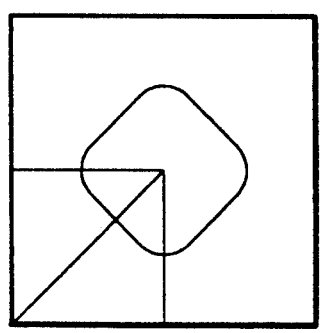
Figure 4F:
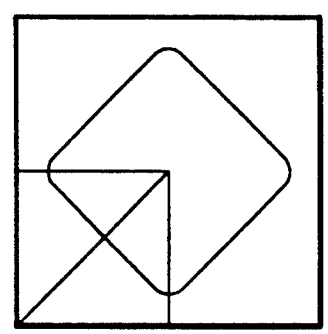
Figure 4G:
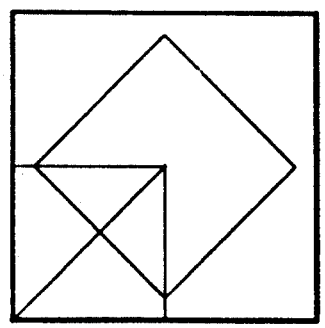
Figure 4H:
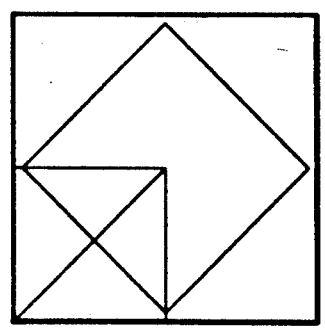
Figure 4I:
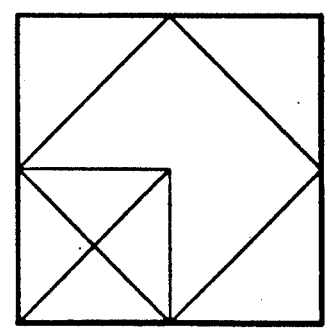

FIGS. 4A through 4I illustrate the dot transitions occurring within reference cells 30 corresponding roughly to the transitions shown in FIGS. 2A through 2I, respectively. In FIG. 4I the corners of the diamond or square are just touching the boundary wall of the unit cell.

Figure 5A:
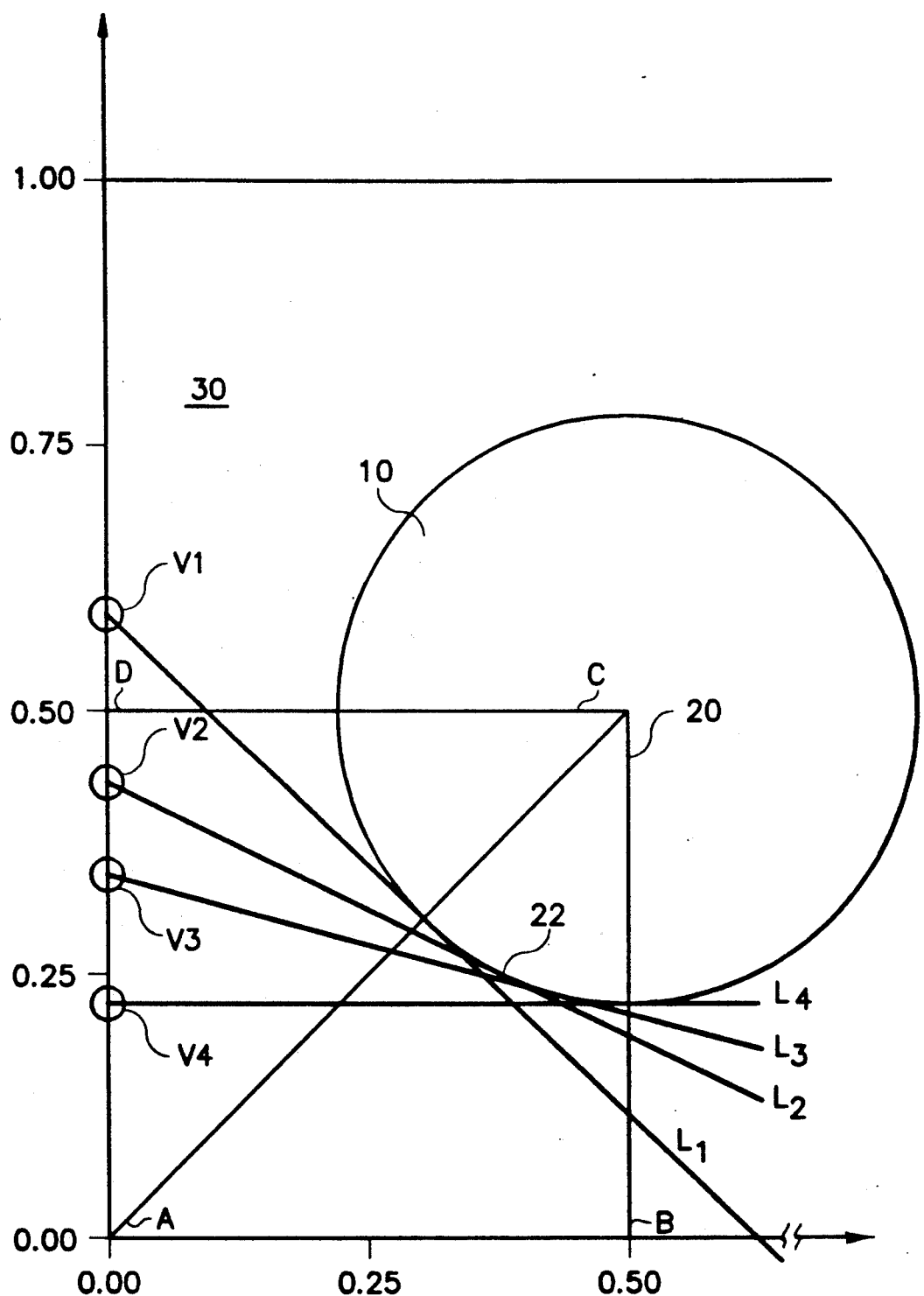
FIGS. 5A, and 5B illustrate dots having an area of less than 50% and more than 50% in a reference cell, with tangent lines intersecting an axis of the reference cell and forming a partial envelope.

FIG. 5A is another enlarged view of the segment of FIG. 3 showing four lines L1 through L4 having the slopes $-1$, $-\frac{1}{2}$, $-\frac{1}{4}$, and 0, respectively which are tangent to the circumference of the dot shape 10 and are totally within the area bounded by the triangle ABC. The envelope formed by the lines L1 through L4 is a good approximation for the circular arc 22.

As previously stated, by multiple symmetries, in this instance eight, the information in the triangle ABC is sufficient to generate the entire halftone dot envelope. For example the arc 22 may be used to generate the entire circular envelope of the halftone dot 10. Therefore it is sufficient to focus on representing the envelope of the dot shape only in the area of the triangle ABC as such a representation may be flipped and folded within the reference cell 30 to form the complete envelope of the dot 10. The lines L1 through L4 intersect the Y-axis at values V1 through V4, respectively. These values are recorded to represent the density (size of the dot 10).

Figure 5B:
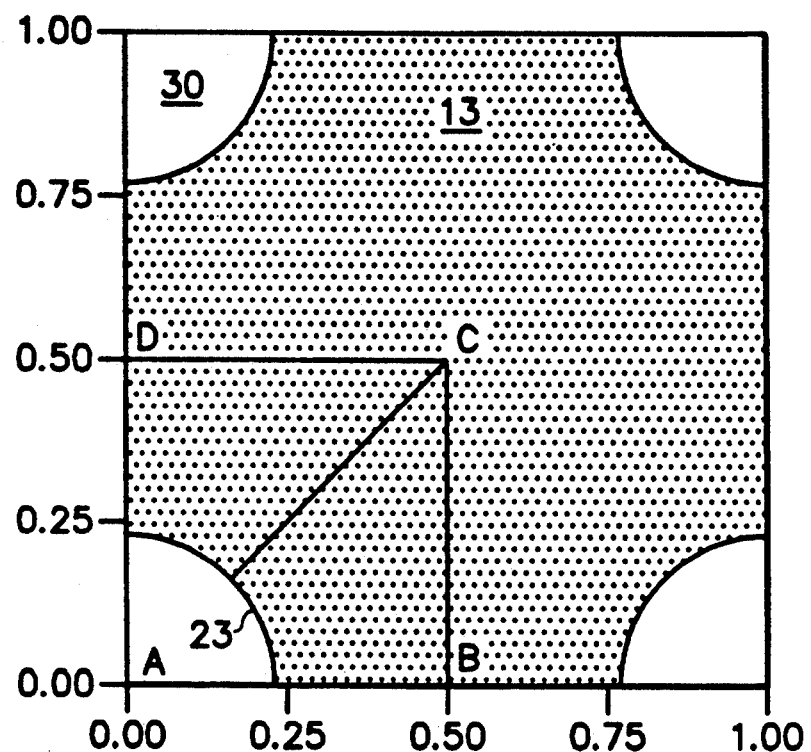
Figure 6B:
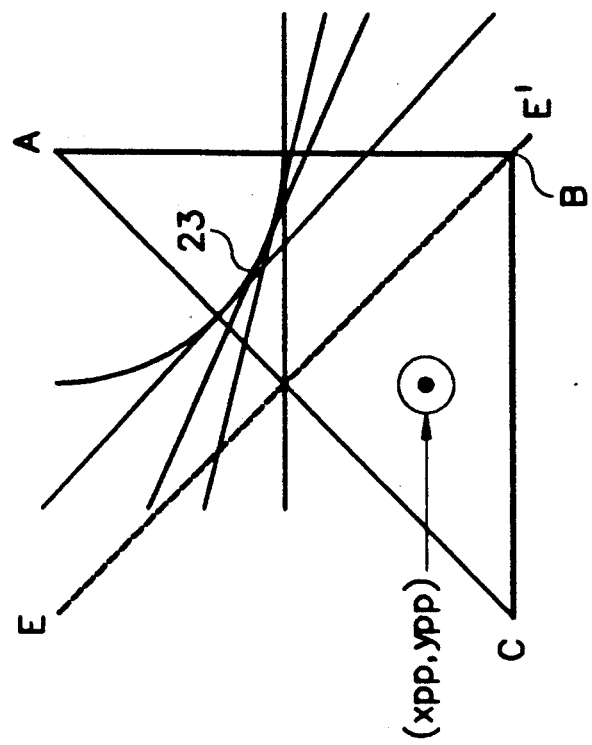
FIGS. 6A and 6B illustrate the folding of a dot formation along an axis of symmetry EE' to provide a point flip.
Figure 6A:
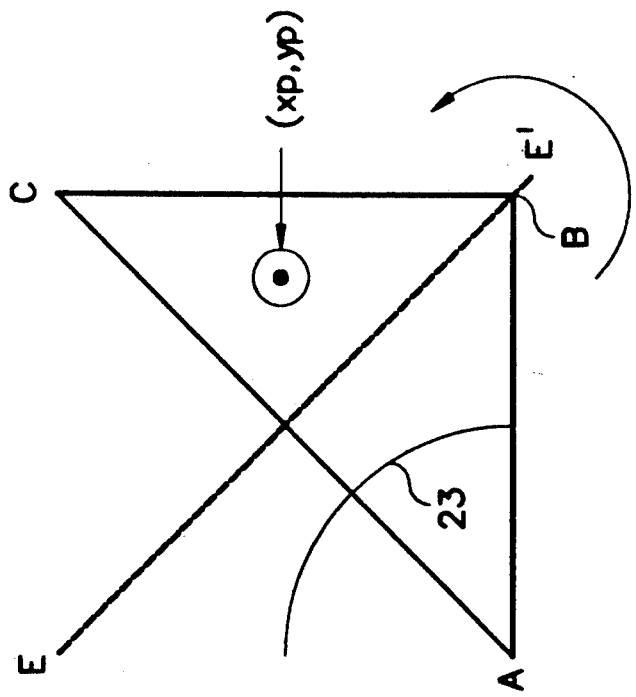

The aforementioned discussion is applicable to dots that are less than 50% of the area of the reference cell. This limit is represented by the dot shown in FIG. 4I. For dots larger than 50%, the dots' outline becomes concave rather than convex as is shown in FIG. 5B. In FIG. 5B, dot 13 is shown with major portions of its outer envelope being aligned abutting with the walls of the reference cell 30. The corner portions of the dot are concave in shape as reflected by the portion labeled 23. The region of interest will now shift to be triangle ABC. In addition to being concave curve 23 is also located in the lower left corner of triangle ABC. By rotating the triangle ABC about the axis EE', as illustrated in FIG. 6A the curve 23 moves to the upper portion of the triangle ABC and appears convex as shown in FIG. 6B. Flipping of the triangle ABC, in this manner allows dots in excess of 50% to be encoded using the same methods that were used for dots less than 50%. As can be seen the tangent lines L1 through L4 still represent the envelope section (curve) 23. Whether the triangle ABC has been flipped or not is recorded in the value of bit V0. Referring to the Table below, pairs of dots of complementary area, such as 20,80 have identical parameters except for the parameter bit V0.

To cause the printing of the dot, for example, by a laser printer there is a corresponding sample point in the unit reference cell 30 that is identified by X and Y coordinate values and a contone value that is derived form the image. The contone value is a value from 0 to $2^N-1$ where N is the number of bits per pixel. A typical value for N is 8 thus contone values would range from 0 to 255. Each contone value has a corresponding halftone dot envelope. The signal to the laser printer is then determined by whether the sample point is inside the dot envelope or not. Referencing FIG. 3, an arbitrary sample point 31 having coordinates (frac_X, frac_Y) is processed as follows:

If frac X_X > ½ then the component X is replaced by 1-frac_X, otherwise the component X remains unchanged. The Y component is processed similarly. Thus the arbitrary sample point has now moved to the position (actual_X, actual_Y) in the lower left quadrant of the unit reference cell since both actual_X and actual_Y must be less than or equal to ½. Next, if actual_Y > actual_X interchange the values of X and Y, otherwise leave them unchanged. The arbitrary sample point has now moved to the position (Xp, Yp) in the triangle ABC since both Xp and Yp are less than or equal to ½ and Yp is less than or equal to Xp. Because of the dot shape symmetry the original point (frac_X, frac_Y) is inside the dot boundary if and only if the point (Xp, Yp) is inside the dot boundary.

It is to be remembered that the selection of four intercept lines for the preferred embodiment is driven by the particular hardware inplementation to be described and that other numbers of lines can also be used, that is, either less and or more lines can be used to define the envelope of the formed dot. It additionally is to be appreciated that other geometric elements besides lines may also be used to represent the envelope of the dot, for example, circular and parabolic arcs or Bezier curves and or splines.

Up to this point in the description the dots have been shown formed of circles for smaller sizes (densities) and diamonds or squares for the larger sizes. It is to be appreciated that other shapes of dots, for example, ellipses may also be handled by the method of this invention. FIG. 5B illustrates the dot pattern when the size of the dot exceeds that of the full diamond of FIG. 4I. In that instance the open spaces around the diamond dot shape commence to reduce in size and or close. This reduction of the open corner spaces occurs in the reverse order of that shown in FIGS. 2A through 2I. That is, as the dark part of the dot fills in, the open areas close towards circle shapes that appear in each of the four corners of the halftone reference cell. FIG. 5B illustrates this more clearly for a dot pattern that has an area that almost fills the entire halftone cell.

Figure 7:
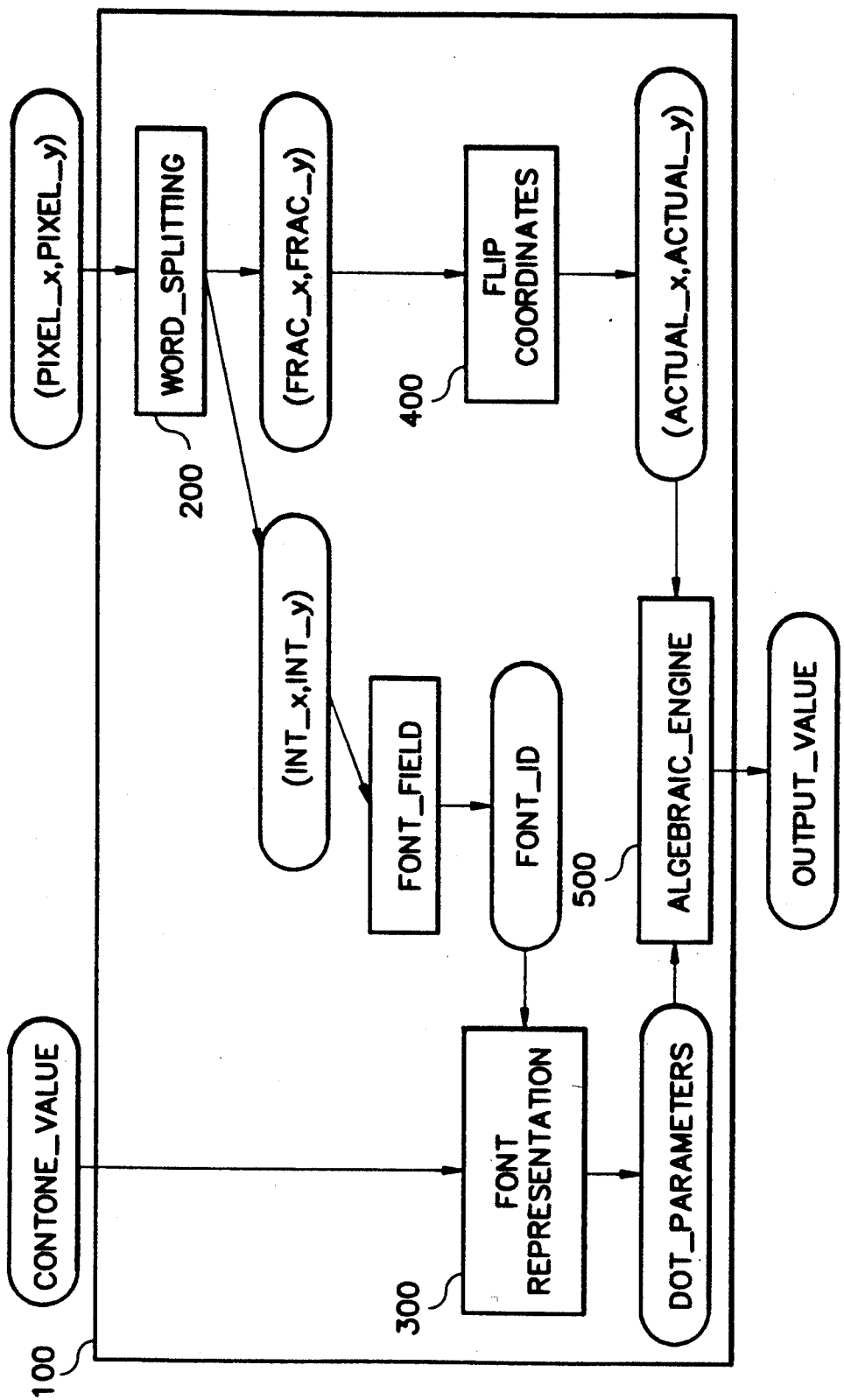
FIG. 7 illustrates, in logic block diagram form, a functional embodiment of the invention.

Referring to FIG. 7, a font decoder 100, is shown in functional detail receiving as inputs the contone value and the X-Y halftone sampling coordinates (pixel_X, pixel_Y) corresponding to the pixel that is to be written (printed). The output value from the font decoder 100 is the bit mapped data that is used to drive a marking engine such as a laser printer. The contone value, as previously stated, has a value of from 0 to 255 and indicates the desired size (density) of the halftone dot. These three values are generated according to the teachings of U.S. Pat. No. 4,977,458.

Figure 8:
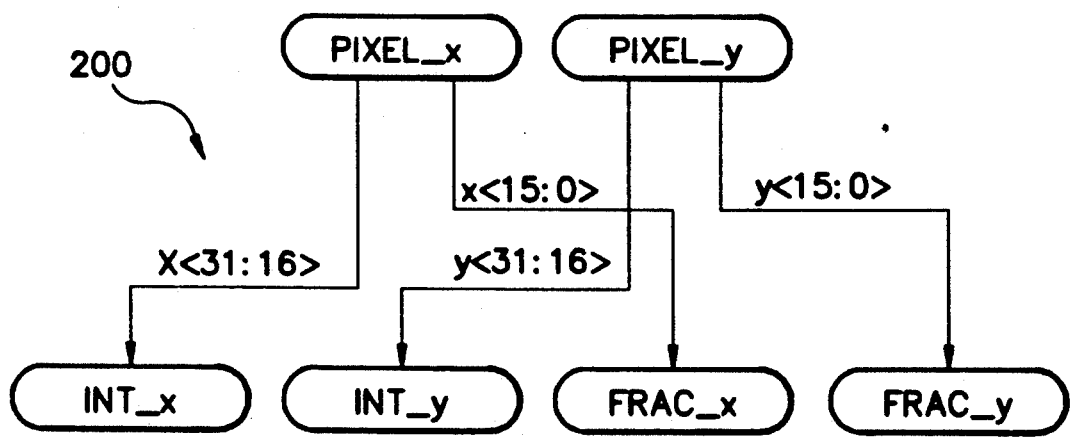
FIG. 8 illustrates in further detail one of the functional blocks of FIG. 7.

Within the font decoder 100 a word splitting module 200, illustrated in logic detail in FIG. 8, functions to form two signal groups of high and low order bits, int and frac, respectively. The values int_x and int_y are represented by 2-bytes (16 bits of the bits defining pixel_x and pixel_y) and the values frac_x and frac_y are represented by 2-bytes of low order bits. The high order bytes represent the integer value of pixel position and the low order bytes represent the fractional value of the pixel's x-y coordinate position. The integer byte values are used to select, from a font representation module 300, which font is to be printed. In the most limited system only one font type would be available. Although many different types of storage devices may be used to addressably store the dot parameters in the preferred embodiment of the invention a look-up table (array 310 in FIG. 9) was used. A partial address is obtained by the contone value with the remainder being obtained from the font_id (when multiple fonts are provided).

Figure 9:
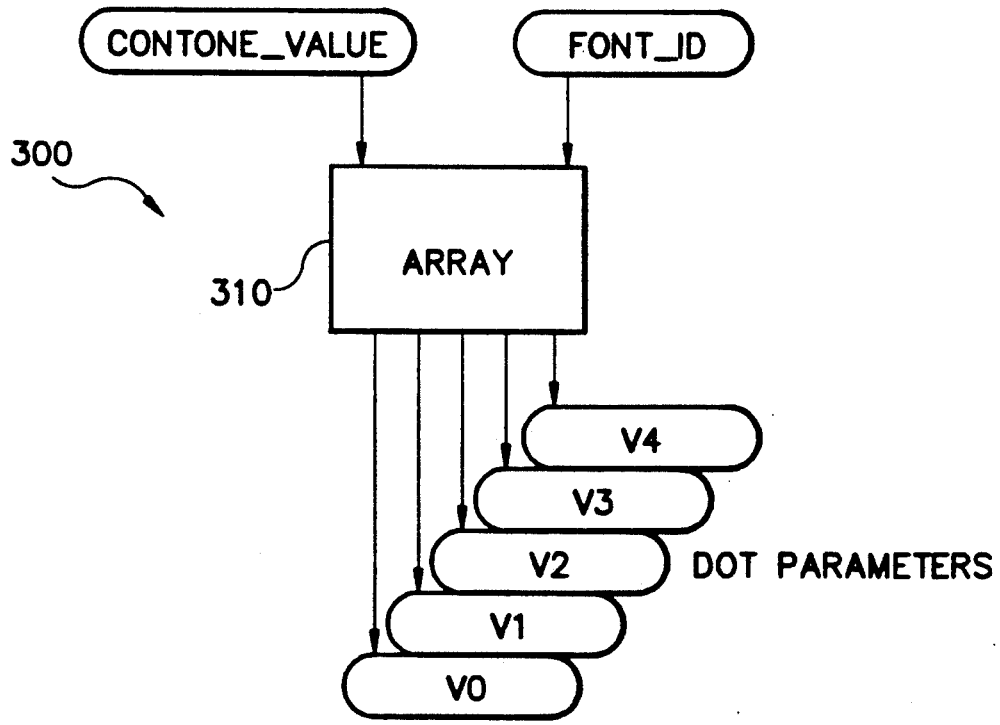
FIG. 9 illustrates in further detail one of the functional blocks of FIG. 7.

The font representation module 300, illustrated in logic form in FIG. 9, is an array 310 (in the preferred embodiment a look-up table) of dot descriptors having a dot descripter for each contone value. Each dot descriptor is a set of dot parameters in which all necessary dot information needed for reconstruction is encoded. For each combination of contone_value and font_id there is a unique set of dot parameters V0, V1, V2, V3, and V4 which are sent to an algebraic engine 500.

The following Table illustrates the values V0–V4 for dot percentages of 10, 20, 40, 60 and 80 size. The values of V1-V4 are encoded assuming a 16bit integer representation as an example. Thus values of 0–65535 represent the full range of 0–1 on the edge of the reference cell (see 5A).

| TABLE OF DOT PARAMETERS | | | | | |
| --- | --- | --- | --- | --- | --- |
| Area | V0 | V1 | V2 | V3 | V4 |
| 10% | 0 | 49000 | 36079 | 25047 | 21075 |
| 20% | 0 | 42150 | 30664 | 15063 | 16232 |
| 40% | 0 | 36227 | 16384 | 8192 | 0 |
| 60% | 1 | 36227 | 16384 | 8192 | 0 |
| 80% | 1 | 42150 | 30664 | 15063 | 16232 |

The algebraic engine 500 determines how the dot is sampled. The four units, word_splitting 200, font representation 300, flip coordinates 400 and algebraic engine 500 work together to form, stepwise, the correctly sized dot pattern for each of the pixel values that in turn form the printed image.

Figure 10:
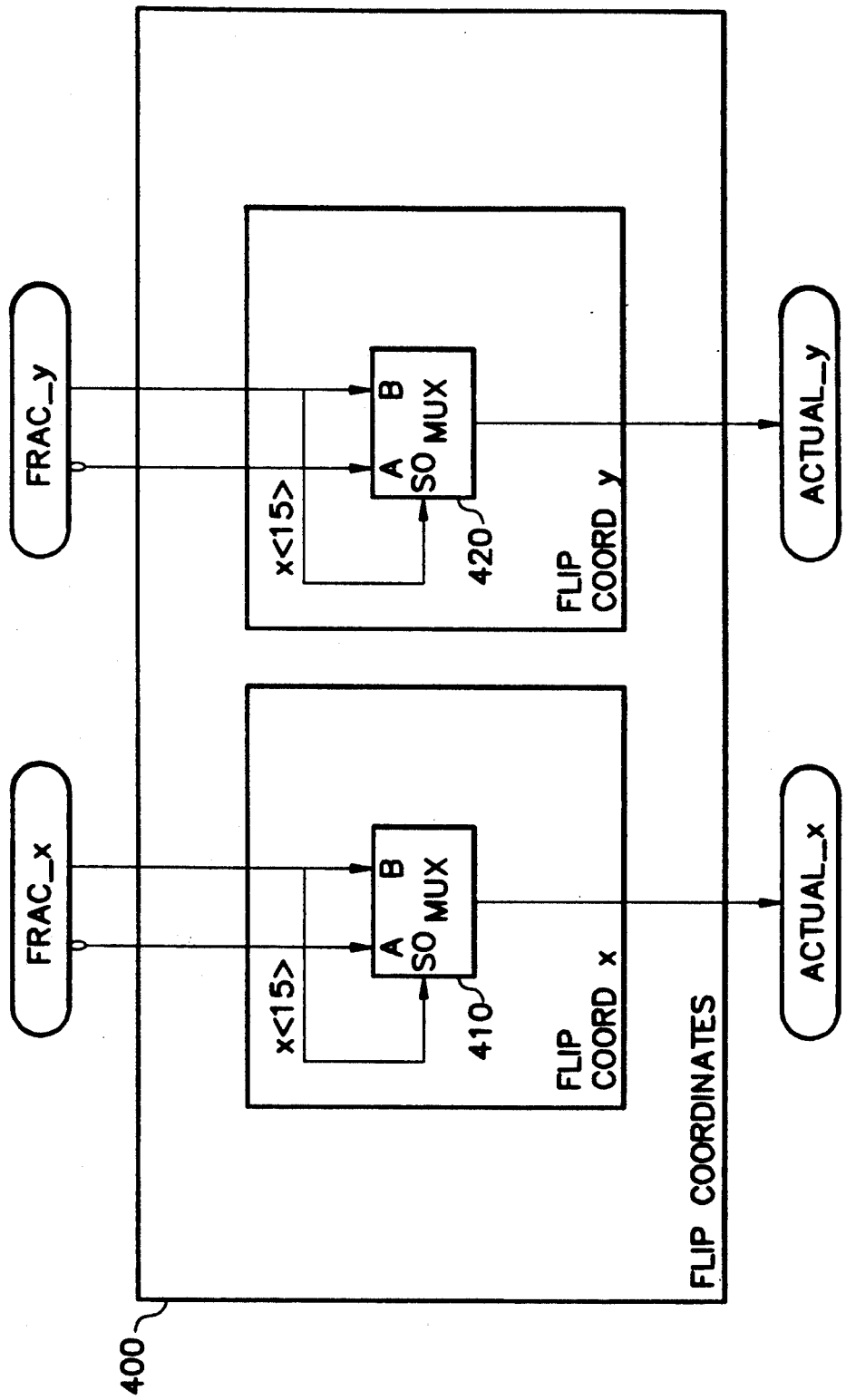
FIG. 10 illustrates in further detail another of the functional blocks of FIG. 7.

The flip coordinates module 400, illustrated in schematic form in FIG. 10, functions to flip the coordinates from the full cell to the lower left quadrant to exploit some of the dot symmetry. This is implemented with multiplexers 410 and 420. The 15th bit of the frac_x and the frac_v signals are used to select whether the multiplexers pass the negated signals on their A input or the non-negated signals that are on the B inputs. In other words, the value of the coordinates x and y are flipped or not flipped dependent on the value of the 15th bit of the non-negated frac_x and frac_y signals. Further appreciation of the flipping action may be had by reference to the like labeled dot positions in the FIG. 3 example.

Figure 11:
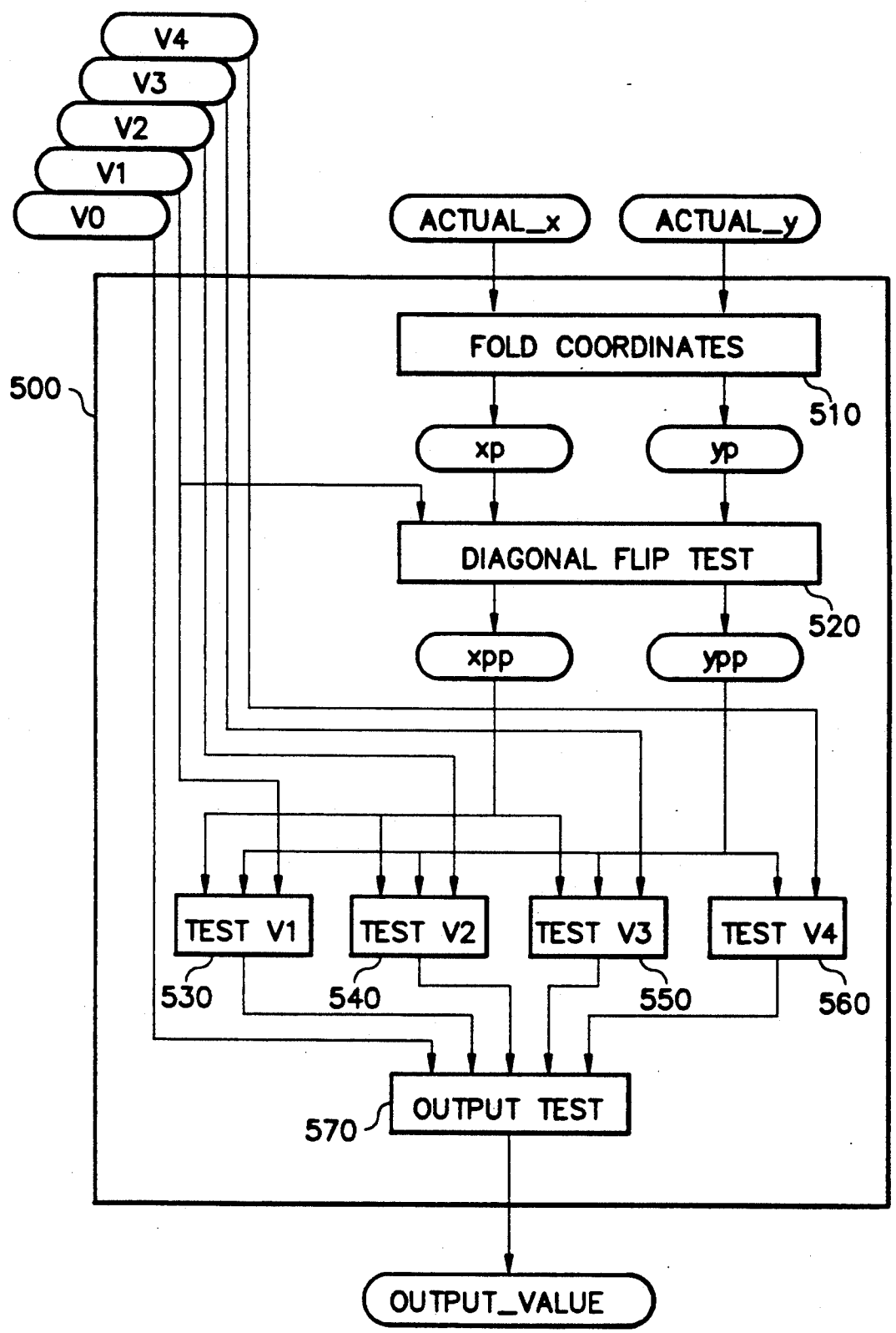
FIG. 11 illustrates in further detail yet another of the functional blocks of FIG. 7.

The algebraic_engine 500, illustrated in logic form in FIG. 11, functions to compute which sampling points are to be used for a particular screener. The result of this coordinate flipping is the sampling point (actual_x, actual_v).

The output value is a single bit intended for a binary writer and is a function of both the dot parameters and the sampling point (actual_x, actual_v). The output is a bit sequence similar to that generated by the font memory 970 of the #622 patent but with less cost.

These logic modules may be run in parallel to achieve multi-bit output if desired.

Figure 12A:
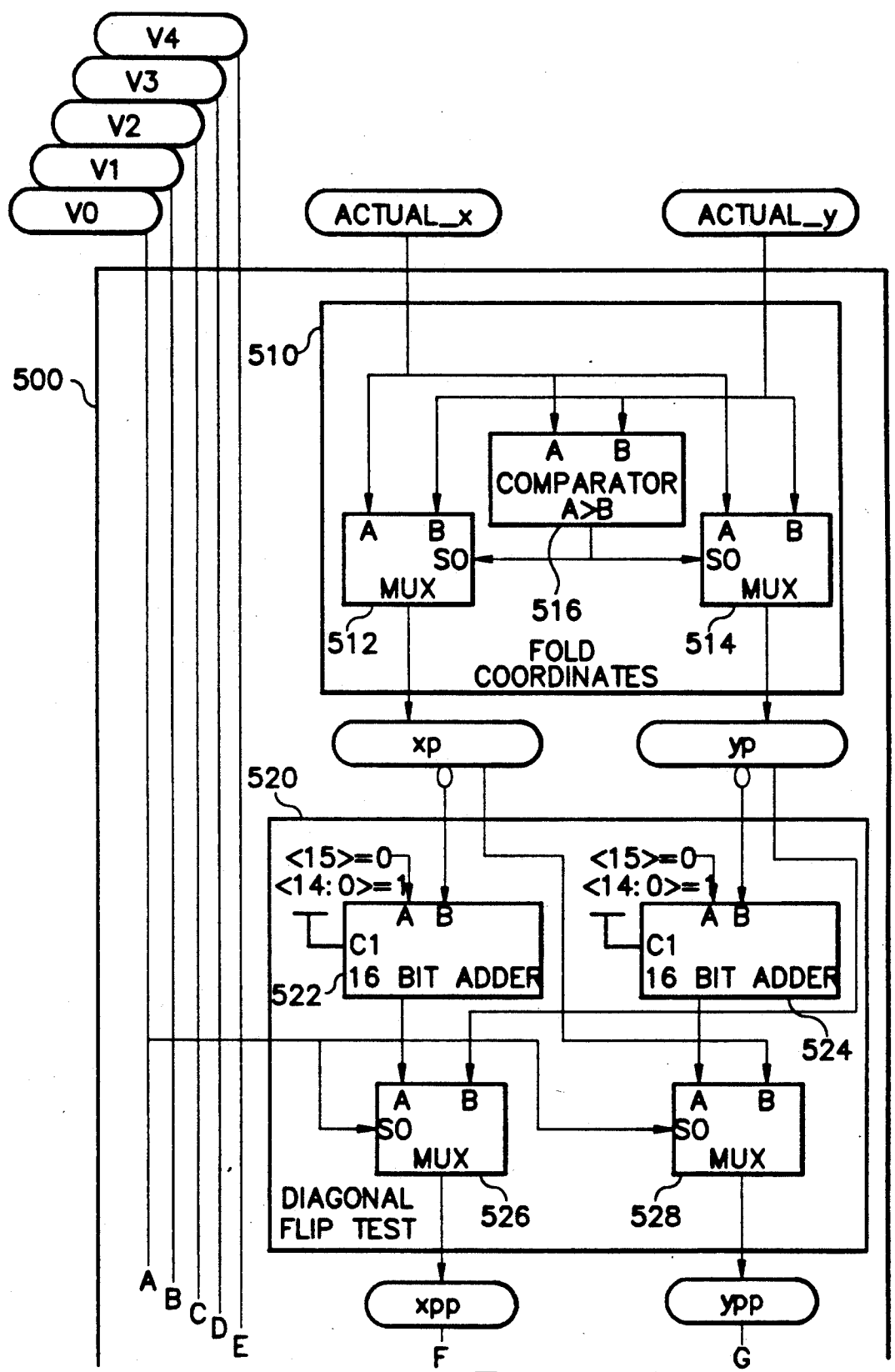
FIGS. 12A and 12B illustrate in block schematic detail the functional block of FIG. 11.
Figure 12B:
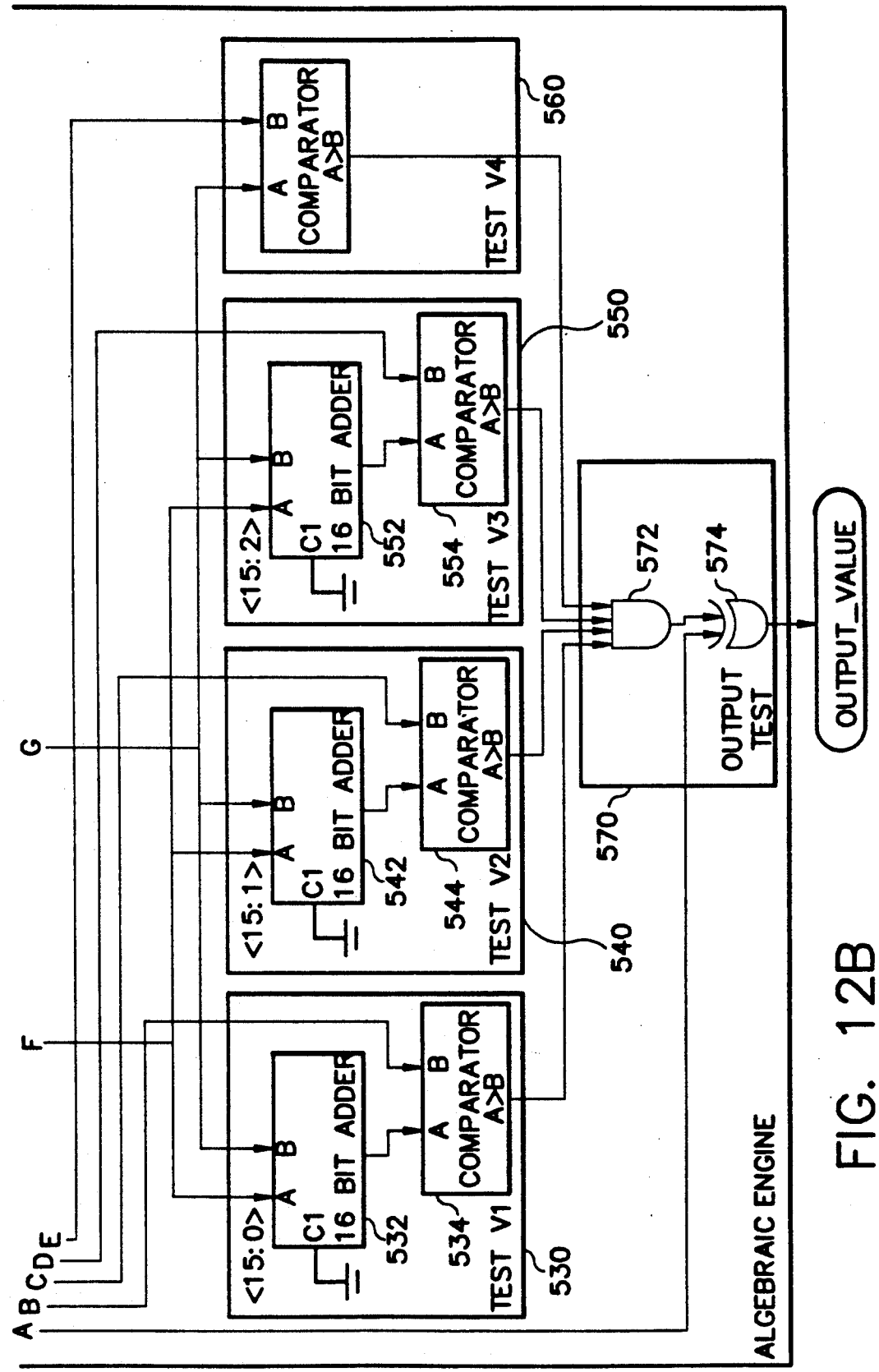

FIGS. 11 and 12 illustrate, in logic block and schematic diagram form, the preferred apparatus implementation of the present invention. In FIG. 10, the signals actual_x and actual_v are directed to the fold coordinates function block 510, wherein it is determined whether the y coordinate is greater than the x coordinate indicating that the point is in the upper left triangle rather than the lower left one. If y is greater than x then $x_p$=actual_y and $y_p$=actual_x. This action flips the point in the upper triangle about the axis AC to the lower triangle. If actual_x is less than or equal to actual_v, then no change is made, i.e. $y_p$=actual_x and $x_p$=actual_y. Either way the point ($x_p$, $y_p$) ends up in the lower right triangle.

The diagonal flip test 520 depends on the bit Vo, indicating whether the dot area is above 50% or not. Referring to FIGS. 6A and 6B if the dot has an area greater than 50% of the reference cell the point ($x_p$, $y_p$) must be rotated about the axis EE' yielding point ($x_{pp}$, $y_{pp}$). If the dot is 50% or less, no change is required, i.e. $x_{pp}=x_p$ and $y_{pp}=y_p$. In either case ($x_{pp}$, $y_{pp}$) will be compared against a convex envelope located in top portion of the triangle ABC.

Once the position of the envelope within the triangle ABC is determined, testing for the point being above or below the envelope may begin. It is to be remembered that the interest points $V_1$-$V_4$ pertain to lines $L_1$-$L_4$ having slopes $-1$, $-\frac{1}{2}$, $-\frac{1}{4}$, and zero respectively.

Test $V_1$ is a test to see if the point ($x_{pp}$, $y_{pp}$) is above or below line $L_1$. If above the test is true.

Test $V_2$, $V_3$, and $V_4$ are similar tests for their respective lines.

The output 570 has two parts, the first determines whether the point ($x_{pp}$, $y_{pp}$) is above the envelope or not. It is above the envelope if all four tests are true. The second part determines whether the point ($x_{pp}$, $y_{pp}$) is within or is outside of the dot so as to cause a printing if inside. Referring specifically to FIG. 12, the algebraic engine 500 receives as inputs the dot parameter values V0, V1, V2, V3, and V4. Parameters V1-V4 are directed to the B inputs of comparators 530, 532, 534, and 536, respectively. The algebraic engine 500 also receives as inputs the actual_x and actual_y signals. The actual_x signal is applied to the A inputs of multiplexers 512 and 514 and to the A input of a comparator 516. The actual_y signal is applied to the B inputs of the multiplexers 512 and, 514 and to the B input of comparator 516.

The output signal from the comparator 516 is used as the selection signal for the multiplexers 512 and 514 and is applied to the selection input labeled S0. Multiplexers 512 and 514 provide at their outputs the signal xp and yp, respectively. These signals are directed to the inputs of the diagonal flip test logic 520. The diagonal flip test is performed with two 16 bit adders 522 and 524 and two multiplexers 526 and 528. The A inputs of the adders each receive 16 bit signals wherein bit 15 is set to 0 and bits 14 through 0 are set equal to 1. The B inputs are the respective xp and yp signals. The flip bit, Vo, is directed to the selection inputs, labeled S0 for multiplexers 526 and 528. If flipping is to occur the coupled cross signals on the B inputs of the multiplexers are passed to the outputs. Otherwise the signals on the A outputs are passed.

The 16 bit adders 532, 542, and 552 receive on their A inputs the signal xpp and on their B inputs the signal ypp. The comparator of 560, performs Test 4, and receives the signal ypp on its A input and the signal V4 on its B input. Comparators 534, 544, and 554 receive on their A inputs the output signals from adders 532, 542 and 552, respectively. The B inputs are connected to receive the signals V1, V2, and V3, respectively. The outputs of each of the comparators is provided as an input to an AND gate 572. The output test logic 570 also includes an Exclusive-OR gate 574 which receives the flip bit V0 and the output from the AND gate 572 to provide at its output the signal output_value.

While there has been shown what is considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

Industrial Applicability and Advantages

The Apparatus of the present invention may be used in any application requiring the printing of halftone dots. The advantage of the present invention is that the amount of memory space needed to store the digital values that represent the different sizes and/or shapes of the dots is significantly reduced.

I claim:

1. Apparatus for generating a halftone dot pattern comprising:
    means for providing dot parameters representing intersect values of a number of lines drawn from boundary points on the envelope of a dot to a reference axis of the dot;
    means for receiving position signals corresponding to the printing coordinates of a marking engine; and
    logic means for comparing the receiving position signals with the provided dot parameters to determine if a printing is to be performed by a marking engine at the printing coordinates and for providing an output signal for enabling the marking engine.

2. The apparatus according to claim 1 wherein said means for providing dot parameters provides groups of dot parameters, with each group representing a dot of different size.

3. The apparatus according to claim 2 wherein said means for providing dot parameters provides groups of dot parameters, with each group representing a dot of different type.

4. The apparatus according to claim 3 wherein said logic means includes;
    means for utilizing the dot parameters representing only a symmetrical segment of the envelope of a dot to provide said output signal to enable the marking engine.

5. Apparatus for generating a halftone dot pattern utilizing dots defined by envelope parameters comprising:
    addressable memory means for storing a plurality of dot descriptors each at its own address with each descriptor formed from a set of dot parameters and each set of parameters including intercept values representing corresponding halftone dot sizes wherein dot size corresponds to a density value and wherein said intercept values represent the intercept of tangent lines with a reference axis and the outer boundary of the dot;

means for receiving signals representing the printing position of a dot onto a receiving medium and for selecting fonts and for providing a partial address to said addressable memory means in response to said received signals;

means for providing a contone value to said addressable memory means to provide the remaining portion of the address to select a corresponding set of dot parameters; and engine means coupled to said addressable memory means for receiving the set of dot parameters and the signals representing a dot's printing position for providing output values to a printing engine for causing the printing of a halftone dot at the indicated position with the dot's size and shape being represented by the set of dot parameters.

6. The apparatus according to claim 5 wherein the dot parameters represent at least one segment of symmetry of the envelope of the dots and said engine means further comprises:

means for reconstructing said dots from said dot parameters by flipping the at least one segment of symmetry to complete the entire dot envelope.

7. The apparatus according to claim 6 and further comprising:

means for providing flip coordinates to said engine means comprised of:

first and a second multiplexers receiving as selectable inputs bits representing the x and negated x coordinate and the y and the negated y coordinate, respectively of the dot that is to be printed, said multiplexers having a selection input for receiving a selection bit that selects which bits will be passed to said engine means to represent actual x and actual y coordinates.

8. The apparatus according to claim 6 wherein said engine means is further comprised of:

means for receiving the signals representing a dots printing position and for folding, the position to be within the segment of symmetry represented by said dot parameters and for providing signals representing the folded position;

flipping means for flipping the position represented by the provided signals wherein a dot parameter indicates that the size of the dot exceeds a predetermined size;

testing means for receiving and testing the provided signals from said flipping means with the received dot parameters to provide an output print value for all coordinate positions within the envelope of a selected dot.

* * * * *